US008964659B2

(12) United States Patent
Vujcic

(10) Patent No.: US 8,964,659 B2
(45) Date of Patent: Feb. 24, 2015

(54) RANDOM ACCESS CHANNEL RESOURCE ALLOCATION

(75) Inventor: Dragan Vujcic, Limours (FR)

(73) Assignee: LG Electronics Inc., Seoul (KR)

(*) Notice: Subject to any disclaimer, the term of this patent is extended or adjusted under 35 U.S.C. 154(b) by 178 days.

(21) Appl. No.: 13/147,358

(22) PCT Filed: Nov. 12, 2009

(86) PCT No.: PCT/KR2009/006652
§ 371 (c)(1),
(2), (4) Date: Aug. 1, 2011

(87) PCT Pub. No.: WO2010/087570
PCT Pub. Date: Aug. 5, 2010

(65) Prior Publication Data
US 2012/0002617 A1   Jan. 5, 2012

Related U.S. Application Data

(60) Provisional application No. 61/149,335, filed on Feb. 2, 2009, provisional application No. 61/159,060, filed on Mar. 10, 2009.

(51) Int. Cl.
*H04W 72/04* (2009.01)
*H04W 74/00* (2009.01)
(Continued)

(52) U.S. Cl.
CPC ........... *H04W 74/002* (2013.01); *H04L 5/0053* (2013.01); *H04L 5/0091* (2013.01); *H04W 74/0833* (2013.01)
USPC ....................................... 370/329

(58) Field of Classification Search
USPC ................... 370/329, 341, 431, 462
See application file for complete search history.

(56) References Cited

U.S. PATENT DOCUMENTS

| 6,574,212 B1 | 6/2003 | Jurgensen et al. |
| 6,778,835 B2* | 8/2004 | You et al. ............... 455/455 |
| 7,321,645 B2* | 1/2008 | Lee et al. ............... 375/343 |

(Continued)

FOREIGN PATENT DOCUMENTS

| EP | 2015594 | 1/2009 |
| WO | 2008/042889 | 4/2008 |

(Continued)

OTHER PUBLICATIONS

Stefan Parkvall et al. LTE-Advanced—Evolving LTE towards IMT-Advanced, 2008, IEEE p. 1-5; 978-1-4244-1722-3/08.*

(Continued)

*Primary Examiner* — Steve Young
(74) *Attorney, Agent, or Firm* — Lee, Hong, Degerman, Kang & Waimey

(57) ABSTRACT

The present invention provides a method of configuring random access resources for random access transmission, the method comprising: determining a number n of preamble signatures that can be used for random access transmission; grouping the n preamble signatures into K groups j (j=1, 2 ¡ K) wherein K corresponds to a number of downlink component carriers and K is greater than or equal to 2; assigning each group j to a respective downlink component carrier; assigning configuration data to each group j; and transmitting the group j configuration data on the corresponding downlink component carrier.

7 Claims, 9 Drawing Sheets

Figure 1:
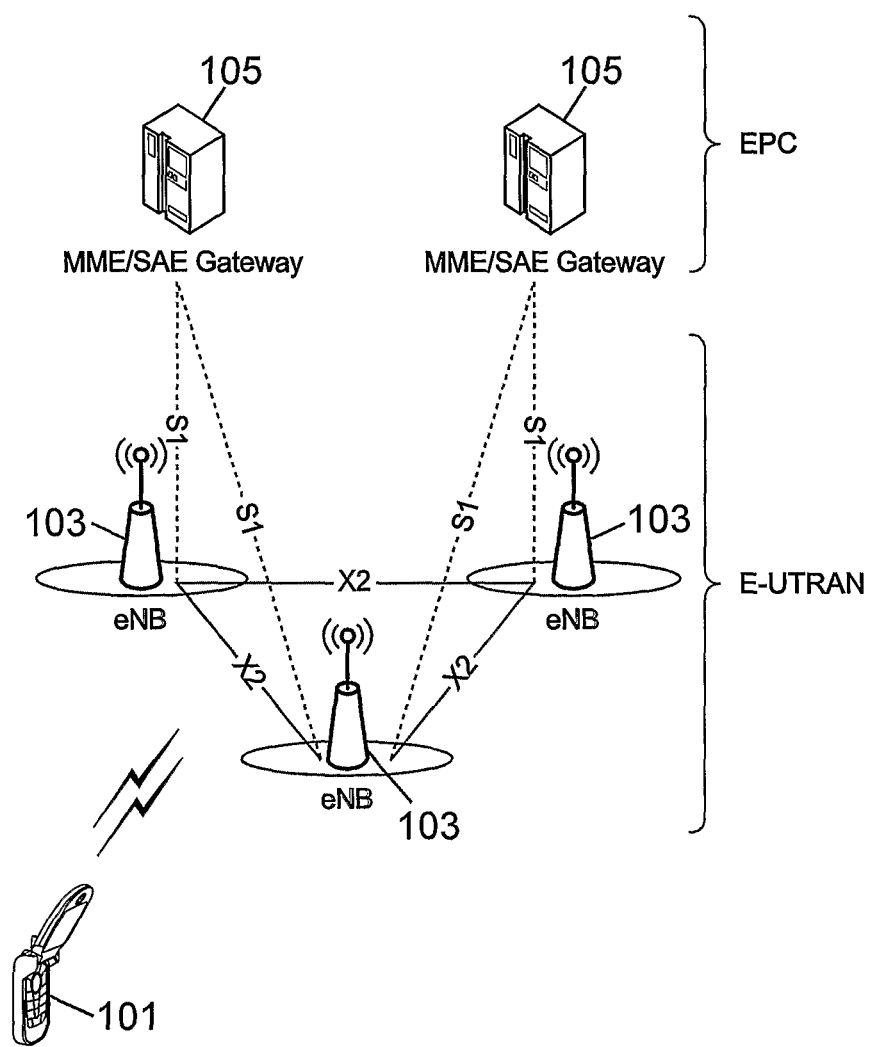

(51) Int. Cl.
*H04L 5/00* (2006.01)
*H04W 74/08* (2009.01)

(56) References Cited

U.S. PATENT DOCUMENTS

| | | | |
|---|---|---|---|
| 8,199,710 B2* | 6/2012 | Kato et al. | 370/329 |
| 2001/0026547 A1* | 10/2001 | Moulsley et al. | 370/347 |
| 2005/0186959 A1 | 8/2005 | Vialen et al. | |
| 2007/0047513 A1 | 3/2007 | Anderson | |
| 2007/0064669 A1* | 3/2007 | Classon et al. | 370/347 |
| 2007/0097909 A1 | 5/2007 | Khandekar et al. | |
| 2007/0147310 A1 | 6/2007 | Cai | |
| 2007/0147326 A1* | 6/2007 | Chen | 370/338 |
| 2007/0264936 A1 | 11/2007 | Kim et al. | |
| 2008/0043671 A1* | 2/2008 | Moon et al. | 370/329 |
| 2008/0043771 A1* | 2/2008 | Cho et al. | 370/431 |
| 2008/0095185 A1* | 4/2008 | DiGirolamo et al. | 370/464 |
| 2008/0096563 A1* | 4/2008 | Fischer et al. | 455/436 |
| 2008/0101305 A1 | 5/2008 | Cave et al. | |
| 2008/0139214 A1 | 6/2008 | Sun et al. | |
| 2008/0225785 A1* | 9/2008 | Wang et al. | 370/329 |
| 2008/0232283 A1* | 9/2008 | Jen | 370/310 |
| 2008/0267126 A1* | 10/2008 | Vujcic et al. | 370/330 |
| 2008/0267161 A1 | 10/2008 | Bertrand et al. | |
| 2008/0316961 A1 | 12/2008 | Bertrand et al. | |
| 2009/0011717 A1* | 1/2009 | Iwasaki | 455/70 |
| 2009/0011769 A1* | 1/2009 | Park et al. | 455/450 |
| 2009/0239545 A1 | 9/2009 | Lee et al. | |
| 2010/0110994 A1 | 5/2010 | Ratsuk et al. | |
| 2010/0260079 A1 | 10/2010 | Baldemair et al. | |
| 2010/0265854 A1 | 10/2010 | Baldemair et al. | |
| 2011/0111785 A1 | 5/2011 | Lindoff et al. | |

FOREIGN PATENT DOCUMENTS

| | | |
|---|---|---|
| WO | 2008/050961 | 5/2008 |
| WO | 2008/050996 | 5/2008 |

OTHER PUBLICATIONS

ZTE, "Initial Uplink Access Procedure in LTE-Advanced", R1-090076, 3GPP TSG RAN WG1 Meeting #55bis, Jan. 2009, XP-050318020.

Texas Instruments, "RACH Procedure for Asymmetric Carrier Aggregation", R1-090284, 3GPP TSG RAN WG1 #55bis, Jan. 2008, XP-050318208.

LG Electronics, "Initial Access Procedure in LTE-Advanced", R1-090210, 3GPP TSG RAN WG1 Meeting #55bis, Jan. 2009, XP-050318141.

NTT DoCoMo, "Initial Access Procedure for Asymmetric Wider Bandwidth in LTE-Advanced", R1-084249, 3GPP TSG RAN WG1 Meeting #55, Nov. 2008, XP-050317534.

Samsung Electronics, "Initial random access in asymmetric carrier aggregation", R1-090093, 3GPP TSG RAN WG1 Meeting #55bis, Jan. 2009, XP-050318036.

3rd Generation Partnership Project (3GPP), "Technical Specification Group Radio Access Network; Evolved Universal Terrestrial Radio Access (E-UTRA) Medium Access Control (MAC) protocol specification (Release 8)", 3GPP TS 36.321 V 8.4.0, Dec. 2008, XP-050377620.

LG Electronics, "Resolving downlink carrier amiguity with RACH", R1-090780, 3GPP TSG RAN WG1 #56, Feb. 2009, XP-050318638.

3rd Generation Partnership Project (3GPP), "Technical Specification Group Radio Access Network; Evolved Universal Terrestrial Radio Access (E-UTRA) Medium Access Control (MAC) protocol specification (Release 8)", 3GPP TS 36.321 V 8.3.0, Sep. 2008, XP-050377620.

United States Patent and Trademark Office U.S. Appl. No. 13/147,589, Office Action dated Feb. 28, 2013, 15 pages.

* cited by examiner

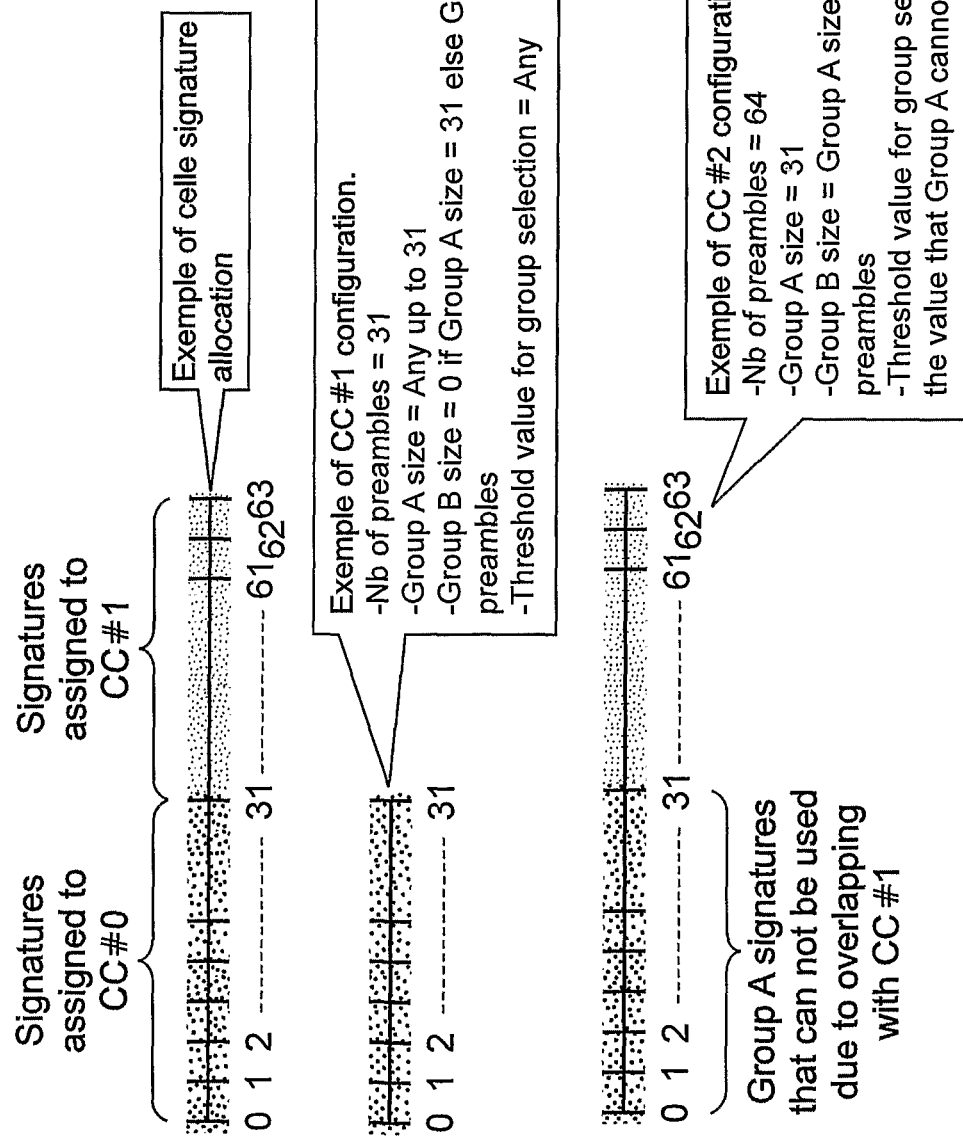

RANDOM ACCESS CHANNEL RESOURCE ALLOCATION

This application is the National Stage filing under 35 U.S.C. 371 of International Application No. PCT/KR2009/006652, filed on Nov. 12, 2009, which claims the benefit of U.S. Provisional Application Ser. Nos. 61/159,060, filed on Mar. 10, 2009 and 61/149,335, filed on Feb. 2, 2009, the contents of which are all hereby incorporated by reference herein in their entirety.

FIELD OF THE INVENTION

The present invention relates to a random access channel (RACH) procedure in a cellular communications network, and in particular to a method and apparatus for configuring random access resources for random access preamble transmission. While it is described below in the context of a long term evolution (LTE) or long term evolution—Advanced (LTE-A) type cellular network for illustrative purposes and since it happens to be well suited to that context, those skilled in the art will recognise that the invention disclosed herein can also be applied to various other types of cellular networks.

DISCUSSION OF THE RELATED ART

A universal mobile telecommunications system (UMTS) is a 3rd Generation (3G) asynchronous mobile communication system operating in Wideband Code Division Multiple Access (WCDMA) based on a European standard known as Global System for Mobile Communications (GSM), and general packet radio services (GPRS). The LTE of UMTS is under discussion by the 3rd generation partnership project (3GPP) that standardised UMTS.

3GPP LTE is a technology for enabling high-speed packet communications. Many schemes have been proposed for the LTE objective including those that aim to reduce user and provider costs, improve service quality, and expand and improve coverage and system capacity. 3G LTE requires reduced cost per bit, increased service availability, flexible use of a frequency band, a simple structure, an open interface, and adequate power consumption of a terminal as an upper-level requirement.

FIG. 1 is a block diagram illustrating a network structure of an evolved universal terrestrial radio access system (E-UTRA). The E-UTRA may be also referred to as an LTE system. The communication network is widely deployed to provide a variety of communication services such as voice and packet data.

As illustrated in FIG. 1, the E-UTRA network includes an evolved terrestrial radio access network (E-UTRAN) and an evolved packet core (EPC) and one or more user equipments (UEs) 101. The E-UTRAN may include one or more evolved NodeBs (eNodeB, or eNB) 103, and a plurality of UEs 101 may be located in one cell. One or more E-UTRAN mobility management entity (MME)/system architecture evolution (SAE) gateways 105 may be positioned at the end of the network and connected to an external network.

As used herein, "downlink" refers to communication from an eNodeB 103 to a UE 101, and "uplink" refers to communication from the UE 101 to an eNodeB 103. UE 101 refers to communication equipment carried by a user and may be also be referred to as a mobile station (MS), a user terminal (UT), a subscriber station (SS) or a wireless device.

An eNodeB 103 provides end points of a user plane and a control plane to the UE 101. MME/SAE gateway 105 provides an end point of a session and mobility management function for UE 101. The eNodeB 103 and the MME/SAE gateway 105 may be connected via an S1 interface.

The eNodeB 103 is generally a fixed station that communicates with a UE 101, and may also be referred to as a base station (BS), a network entity or an access point. One eNodeB 103 may be deployed per cell. An interface for transmitting user traffic or control traffic may be used between eNodeBs 103.

The MME provides various functions including distribution of paging messages to eNodeBs 103, security control, idle state mobility control, SAE bearer control, and ciphering and integrity protection of non-access stratum (NAS) signalling. The SAE gateway host provides assorted functions including termination of U-plane packets for paging reasons, and switching of the U-plane to support UE mobility. For clarity, MME/SAE gateway 105 will be referred to herein simply as a "gateway," but it is understood that this entity includes both an MME and an SAE gateway.

A plurality of nodes may be connected between the eNodeB 103 and the gateway 105 via the S1 interface. The eNodeBs 103 may be connected to each other via an X2 interface and neighbouring eNodeBs may have a meshed network structure that has the X2 interface.

Figure 2A:
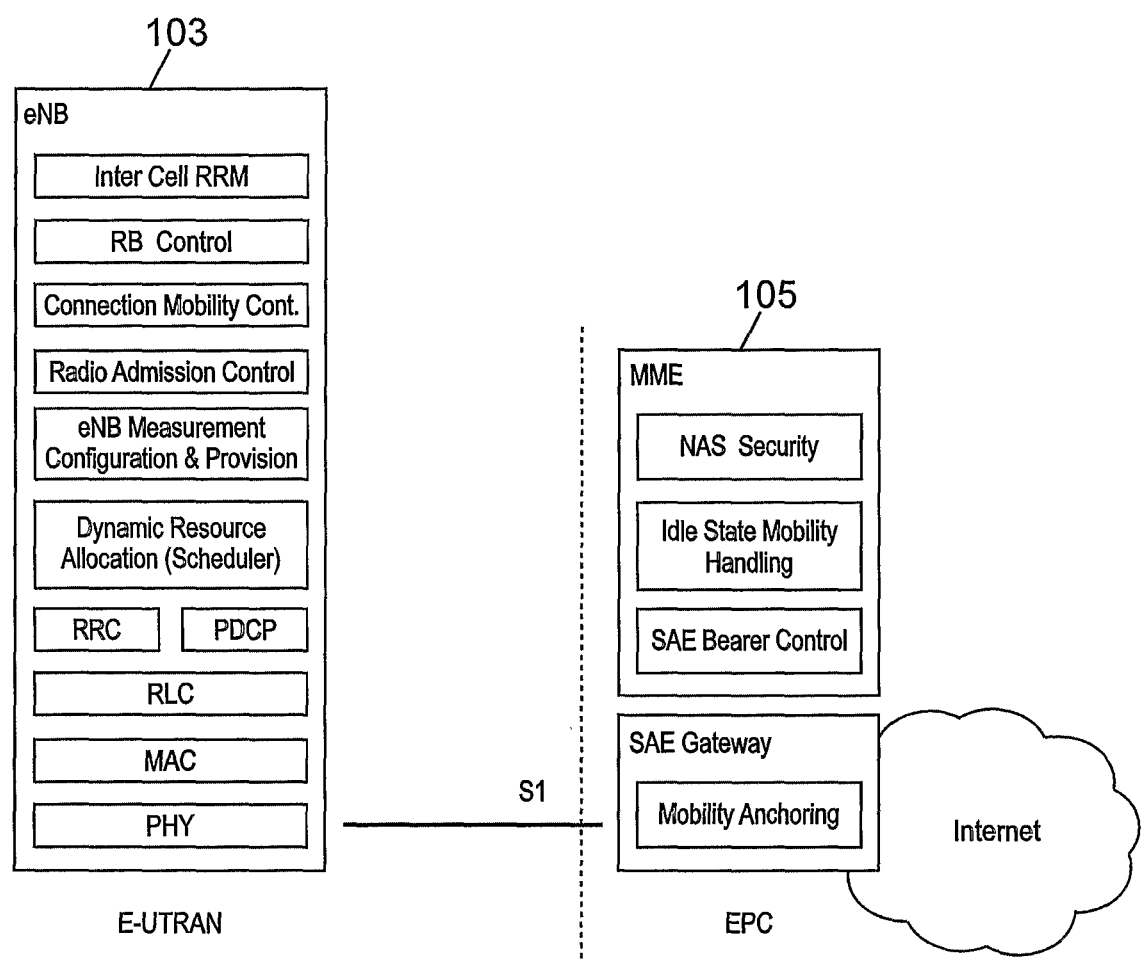

FIG. 2(a) is a block diagram depicting architecture of a typical E-UTRAN and a typical EPC. As illustrated, eNodeB 103 may perform functions of selection for gateway 105, routing toward the gateway during a radio resource control (RRC) activation, scheduling and transmitting of paging messages, scheduling and transmitting of broadcast channel (BCCH) information, dynamic allocation of resources to UEs 101 in both uplink and downlink, configuration and provisioning of eNodeB measurements, radio bearer control, radio admission control (RAC), and connection mobility control in LTE_ACTIVE state. In the EPC, and as noted above, gateway 105 may perform functions of paging origination, LTE-IDLE state management, ciphering of the user plane, system architecture evolution (SAE) bearer control, and ciphering and integrity protection of non-access stratum (NAS) signalling.

Figure 2B:
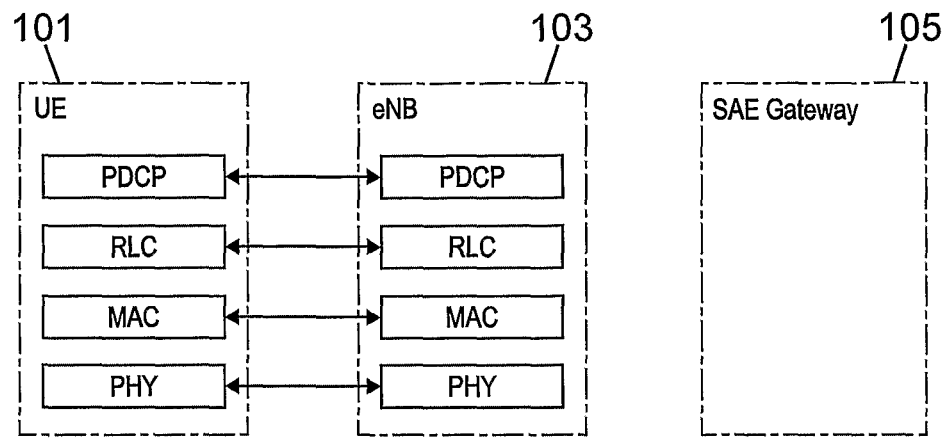
Figure 2C:
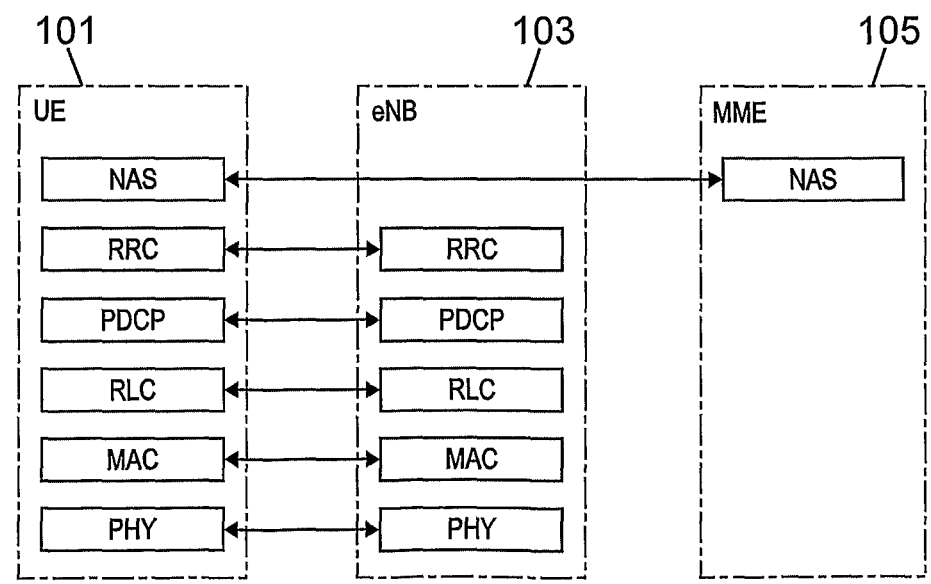

FIGS. 2(b) and 2(c) are block diagrams depicting the user-plane protocol and the control-plane protocol stack for the E-UMTS. As illustrated, the protocol layers may be divided into a first layer (L1), a second layer (L2) and a third layer (L3) based upon the three lower layers of an open system interconnection (OSI) standard model that is well-known in the art of communication systems.

The physical layer, the first layer (L1), provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 (L2) provides services to a radio link control (RLC) layer (which is a higher layer) via a logical channel. The RLC layer of Layer 2 (L2) supports the transmission of data with reliability. It should be noted that the RLC layer illustrated in FIGS. 2(b) and 2(c) is depicted because if the RLC functions are implemented in and performed by the MAC layer, the RLC layer itself is not required. The packet data convergence protocol (PDCP) layer of Layer 2 (L2) performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the E-UTRAN.

As illustrated in FIG. 2(b), the RLC and MAC layers (terminated in an eNodeB 103 on the network side) may perform functions such as scheduling, automatic repeat request (ARQ), and hybrid automatic repeat request (HARQ). The PDCP layer (terminated in eNodeB 103 on the network side) may perform the user plane functions such as header compression, integrity protection, and ciphering.

As illustrated in FIG. 2(c), the RLC and MAC layers (terminated in an eNodeB 103 on the network side) perform the same functions as for the control plane. As illustrated, the RRC layer (terminated in an eNodeB 103 on the network side) may perform functions such as broadcasting, paging, RRC connection management, RB control, mobility functions, and UE measurement reporting and controlling. The NAS control protocol (terminated in the MME of gateway 105 on the network side) may perform functions such as an SAE bearer management, authentication, LTE_IDLE mobility handling, paging origination in LTE_IDLE, and security control for the signalling between the gateway and UE 101.

The NAS control protocol may use three different states; first, a LTE_DETACHED state if there is no RRC entity; second, a LTE_IDLE state if there is no RRC connection while storing minimal UE information; and third, an LTE_ACTIVE state if the RRC connection is established. Also, the RRC state may be divided into two different states such as a RRC_IDLE and a RRC_CONNECTED.

In RRC_IDLE state, the UE 101 may receive broadcasts of system information and paging information while the UE 101 specifies a discontinuous reception (DRX) configured by NAS, and the UE has been allocated an identification (ID) which uniquely identifies the UE in a tracking area. Also, in RRC-IDLE state, no RRC context is stored in the eNodeB 103.

In RRC_CONNECTED state, the UE 101 has an E-UTRAN RRC connection and a context in the E-UTRAN, such that transmitting and/or receiving data to/from the network (eNodeB) becomes possible. Also, the UE 101 can report channel quality information and feedback information to the eNodeB 103.

In RRC_CONNECTED state, the E-UTRAN knows the cell to which the UE 101 belongs. Therefore, the network can transmit and/or receive data to/from the UE 101, the network can control mobility (handover) of the UE 101, and the network can perform cell measurements for a neighbouring cell.

In RRC_IDLE mode, the UE 101 specifies the paging discontinuous reception (DRX) cycle. Specifically, the UE 101 monitors a paging signal at a specific paging occasion of every UE specific paging DRX cycle.

The procedure where a UE sends a first message to a network is commonly referred to as initial access. In most systems the initial access is initiated by a UE transmitting a connection request message including the reason of the request, and receiving an answer from the network indicating the allocation of radio resources for the requested reason.

In 3GPP TS 25.331 there are several reasons, referred to as establishment causes, for sending a connection request message. Establishment causes include: originating conversational/streaming/interactive/background/subscribed traffic call, terminating conversational/streaming/interactive/background call, emergency call, inter radio access technology (RAT) cell re-selection, inter-RAT cell change order, registration, detach, originating high/low priority signalling, call re-establishment and terminating high/low priority signalling.

An "originating call" establishment indicates that the UE 101 wishes to setup a connection, for instance a speech connection. A "terminating call" establishment indicates that the UE 101 answers to paging. A "registration" establishment indicates that the user wants to register only to the network.

To initiate access to the network a random access procedure is used. The physical random access transmission is under the control of higher layer protocol which performs some important functions related to priority and load control. These procedures differ in detail but GSM, UMTS and LTE radio systems have some similarities between them.

In the random access procedure the UE 101 randomly selects an access resource and transmits a RACH preamble to the network. A preamble is a short signal that is sent before the transmission of the RACH connection request message. The UE 101 can repeatedly transmit the preamble by increasing the transmission power each time the preamble is sent until the network indicates the detection of the preamble. The message part can then be sent at the level of power equal of the last preamble transmission power plus an offset signalled by the network.

A random access channel (RACH) is a common physical channel dedicated to the random access procedure. Uplink transmissions are generally initiated through a RACH. A UE sending data on a RACH has not yet been identified by the target eNB. RACH is typically an uplink common channel used for transmitting control information and user data. It is applied in random access, and used for low-rate data transmissions from the higher layer. Such a channel is said to be contention-based since many users can attempt to access the same base station simultaneously, leading to collisions. A RACH channel can be used for several purposes. For example the RACH can be used to access the network, to request resources, to carry control information, to adjust the time offset of the uplink in order to obtain uplink synchronisation, to adjust the transmitted power, etc.

A random access procedure can be launched by the UE or the eNodeB. It may, for instance, be triggered by the following events:

a UE switches from power-off to power-on and needs to be registered to the network.

a UE is not time-synchronized with a eNodeB and starts transmitting data (for instance the user calls).

a eNodeB starts transmitting data to the UE but they are not synchronized (for instance the user receives a call).

a eNodeB measures a delay of the received signal from the UE (for instance the user is moving and has lost synchronization).

a UE is moving from one cell to another and needs to be time-synchronized with a different target eNodeB than the serving eNodeB it is registered to (handover).

Figure 3:
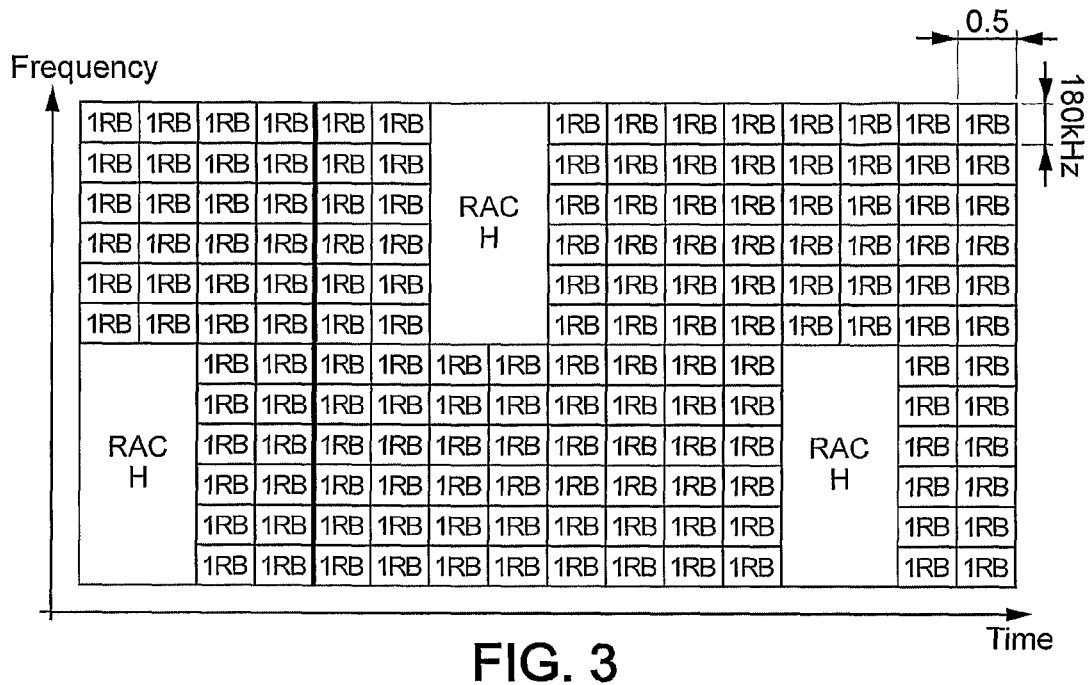

In LTE, the basic unit of time is a slot (generally of a duration of 0.5 ms). Two slots make up a subframe and ten subframes constitute a radio frame. A random access channel typically occupies 6 resource blocks in a subframe or set of consecutive subframes reserved for random access preamble transmissions. A RACH period can be configured to be, for example, 1 ms, 2 ms, 5 ms and 10 ms. FIG. 3 shows one possible mapping of the RACH within a resource grid.

Figure 4:
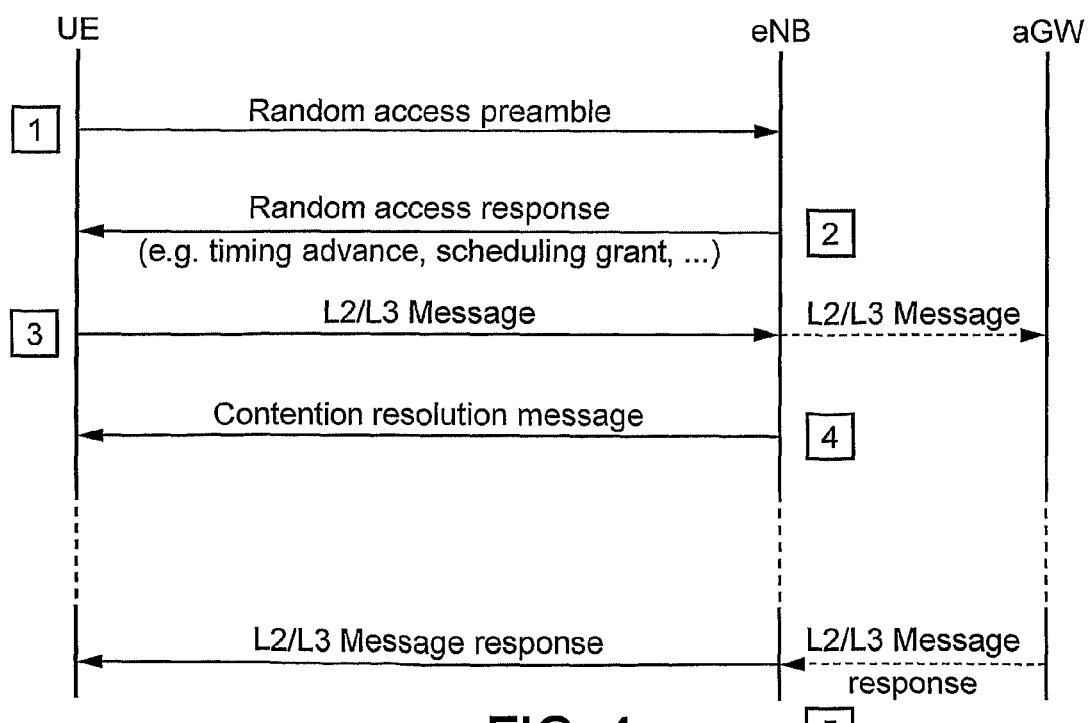

FIG. 4 illustrates an example of the sequences of messages and responses exchanged between a user equipment UE 101 and a base station eNB 103 in a typical RACH procedure.

Firstly the UE 101 retrieves information transmitted periodically from eNB 103 on a downlink broadcast channel (BCH). The received information includes the available preamble signatures in the cell, the location and period of RACH time slots; From the received information the UE 101 selects a preamble signature, a RACH time slot and a frequency band. The preamble signature is chosen by the UE 101 from among a set of preamble signatures known by the eNB 103. The UE 101 generates a single random access burst containing the chosen preamble signature and transmits it to the eNB 103 over the selected time slot at the selected frequency in message 1.

Figure 5:
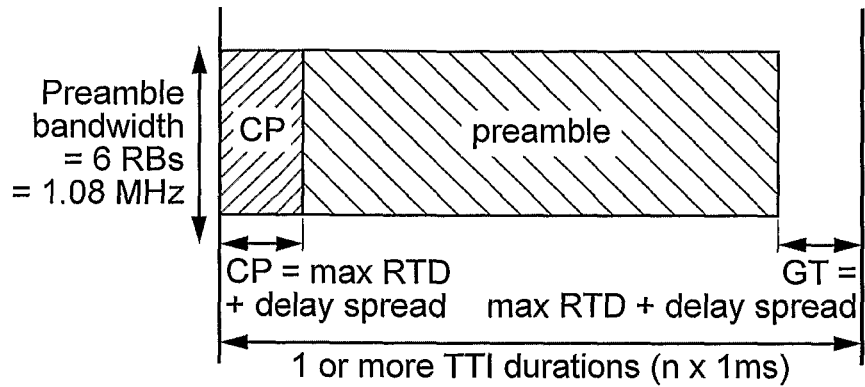

The random access burst consists of a cyclic prefix, a preamble, and a guard time during which nothing is transmitted as illustrated in FIG. 5. CP denotes cyclic prefix, GT denotes guard time, RTD denotes round trip delay and TTI denotes transmission time interval.

The preamble is sent before a RACH connection request and indicates that the UE is about to transmit data. The random access burst is transmitted during one subframe. While the UE is not synchronized in the time domain, its random access burst may overlap with the next subframe and generate interference. A guard time may thus be added to combat interference. The guard time (GT) should be at least equal to the round-trip delay at the cell edge.

During the random access procedure, several users share the same channel. They are distinguishable by virtue of orthogonal sequences. These sequences are seen as the UE preamble signatures that can be transmitted simultaneously. A collision occurs whenever several users choose the same signature and send it within the same time and frequency resources.

The eNB 103 monitors the current RACH slot in an attempt to detect preambles transmitted from UEs in the corresponding cell.

On reception of a signal the eNB 103 correlates the received signal in the RACH sub-frame with all possible signatures. Detection of the preamble can be either performed in the time domain or in the frequency domain. A detection variable is computed for each signature. If the detection variable exceeds a certain threshold, the preamble is considered detected.

The eNB 103 sends a random access response to acknowledge the successfully detected preambles in message 2. This message is sent on a dedicated downlink channel and uses the detected signature. It contains a timing advance command, a power-control command. If the procedure is contention-free then the UE and the eNodeB are thereby aligned in the time domain.

If the UE 101 receives a response from the eNB 103 the UE 101 decodes the response and adapts its transmission timing, and its transmission power if the response contains power control information. The UE 101 then sends a resource request message—message 3—on a dedicated uplink channel. In this message, the UE requests bandwidth and time resources to transmit data and it also indicates a UE-specific identifier. If the UE requests resources, the UE 101 uses a specific ID in the message to resolve contentions. Then the UE monitors a specified downlink channel for response from the eNB. In the case of a positive resource grant, the subsequent transmissions are carried out as normal.

The eNB attempts to resolve any contentions. If the eNB 103 receives a resource request with a UE-specific signature the eNB 103 checks how many UEs were detected with the same signature and resolves any possible contentions. If the preamble sent by UE 101 was in collision with a preamble from another UE, the eNB 103 sends a contention resolution message—message 4—to give the command to UE 101 to re-start the RACH procedure. If on the other hand the UE 101 was not in collision, the eNB sends a resource assignment message—message 5. In this case the subsequent transmissions are carried out as usual. The eNB 103 identifies the UE 101 and assigns resources according to the scheduling rules applied.

In the random access response, message 2, the UE may receive an ACK signal from the eNB to indicate that a message can be sent, a NACK signal indicating that the preamble was detected but a message cannot to be sent, or no response indicating that the preamble was not detected.

In the case where UE 101 receives no response indicating that a preamble has not been detected at the first attempt the UE 101 waits for the next RACH slot to send another preamble. The preamble signal-to-noise ratio (SNR) is relatively low compared to data SNR owing to the length of the zero-correlation sequences. Given that the random access channel does not generate much interference, the UE can afford to increase the transmission power by a few decibels (dB) at the second attempt to prevent consecutive failures (power ramping method). A too long delay is not desirable, especially in the case of handovers. The UE 101 repeatedly transmits the preamble by increasing the transmission power every time the preamble is sent until the network indicates the detection of the preamble. The procedure is exited after a certain number of failures. If a preamble is successfully transmitted the message part is generally sent at the level of power equal to the last preamble transmission power plus an offset signaled by the network.

Figure 6:
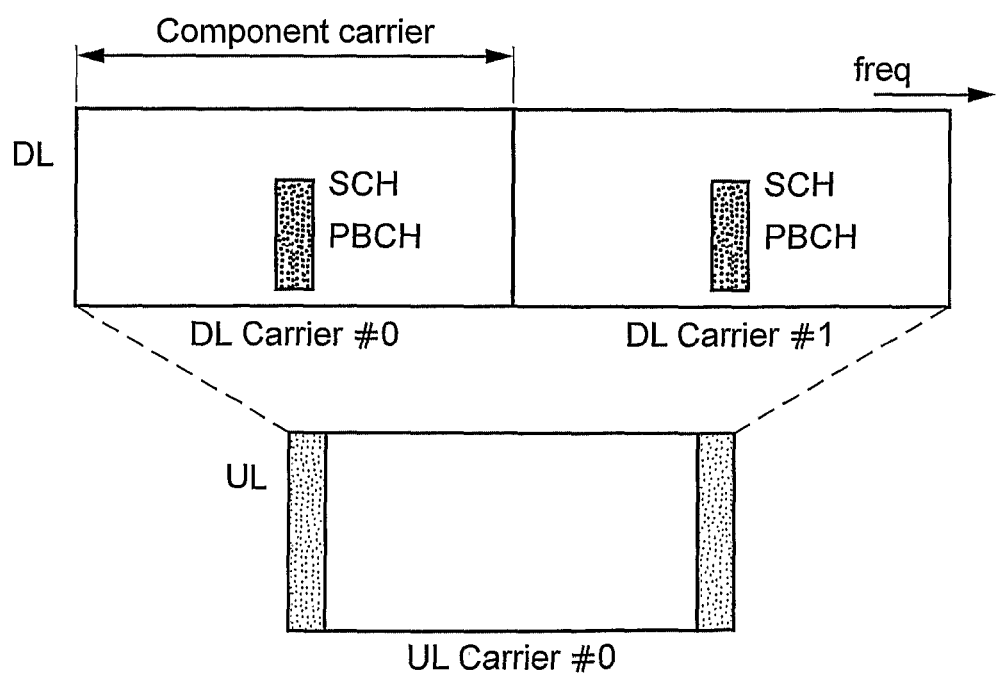

In LTE-A (Long Term Evolution—Advanced) communications carrier aggregation has been adopted in order to provide increased transmission bandwidth. Cell-specific asymmetric carrier aggregation may also be applied in LTE-A, i.e. different numbers of component carriers are aggregated in downlink and uplink between a UE and an eNB respectively as illustrated in FIG. 6. In contention based random access, asymmetric carrier aggregation can result in an ambiguity for the eNB since it has no knowledge on which downlink component carrier a UE is camping on in order to send a random access response. This ambiguity may impact eNB's behaviour in the rest of the random access procedure and result in resource waste.

A number of approaches have been made in an attempt to resolve such ambiguity with higher layer signaling. The drawbacks of such solutions include no backward compatibility, a waste of uplink or downlink resources and an increased processing complexity.

Figure 7:
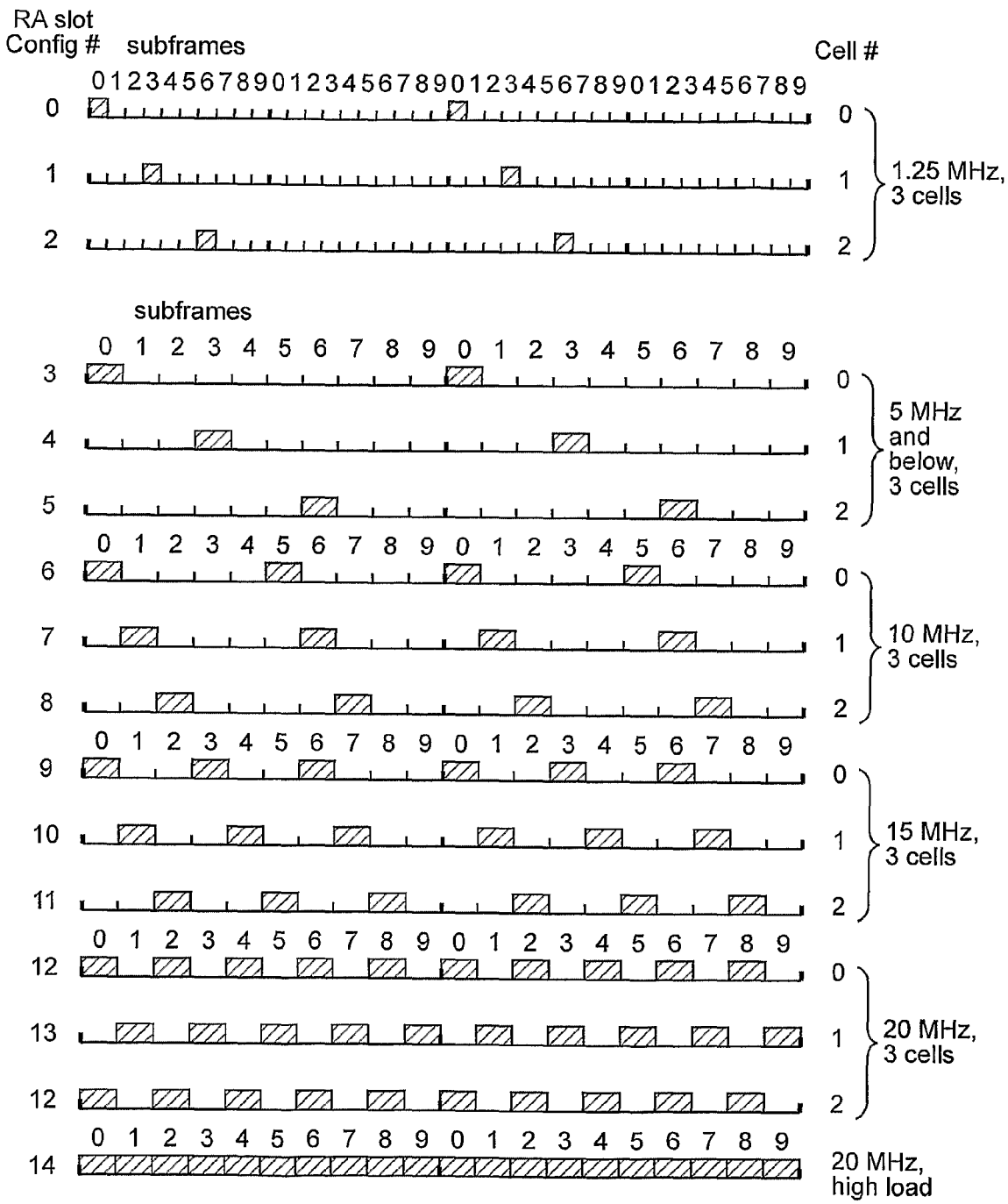

In some approaches in order to distinguish between different downlink component carriers $CC_1 \ldots CC_K$ different random access configuration can be assigned to each downlink DL CC, where the sub frame timing of RACH preamble detection can be easily translated into a DL CC number. From among 64 RACH configurations, for example, the number of possible combinations is limited to the expected random access load and the uplink system bandwidth. Since the RACHs for different DL CC should be allocated to different sub frames, the intersection of the allocated configuration may be avoided. In addition the configuration in the time domain has been specifically designed to avoid possible confusion with random access period of 3 sub-frames for each of the UL bandwidths except for the 20 MHz case, where it is minimized to 2 sub-frames, as illustrated in FIG. 7.

In alternative approaches, in order to avoid the difficulty of allocating different random access configurations with null intersection, the same random access configuration in the time domain can be assigned to each downlink component carrier $CC_1 \ldots CC_K$. In this case, downlink component carrier discrimination can be achieved by RACH frequency position where each downlink component carrier can broadcast its own RACH frequency configuration. Although only one PRACH is available per sub-frame for LTE FDD, there may be multiple PRACHs on different frequency positions per sub-frame in the case of LTE TDD mode. Accordingly, it is possible to allocate different PRACHs to each DL component carrier by explicitly indicating different frequency values on higher layer with common parameter $n^{RA}_{PRBoffset}$, while backward compatibility is maintained.

Figure 8A:
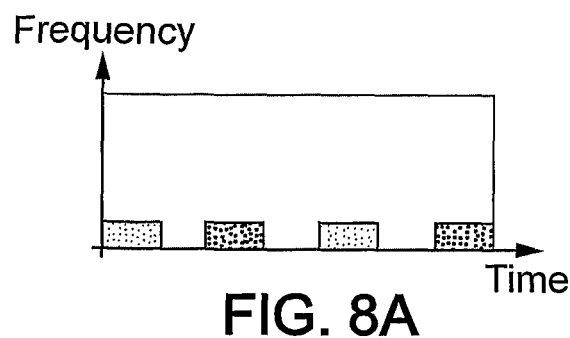
Figure 8B:
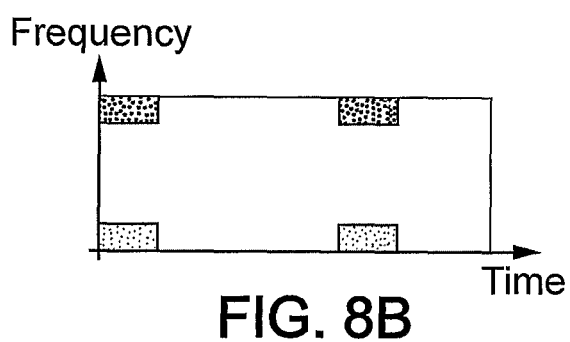
Figure 8C:
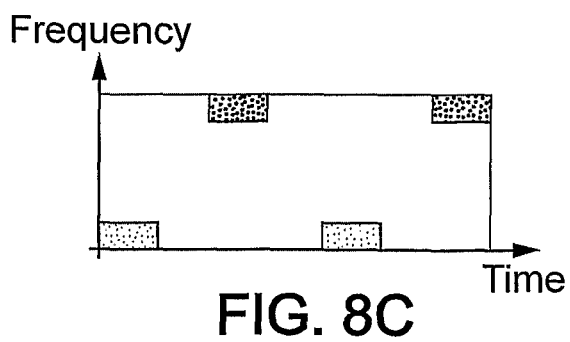

Combination of different time random access configuration and different frequency allocation can be also considered as illustrated in FIGS. 8A to 8C. In FIG. 8A a common RACH frequency position and different RACH timing is adopted for two downlink component carriers $CC_0$ and $CC_1$. In FIG. 8B a different RACH frequency position and the same RACH timing is adopted for two downlink component carriers $CC_0$ and $CC_1$. In FIG. 8C a different frequency position and different RACH timing is adopted for two downlink component carriers $CC_0$ and $CC_1$.

However, although time/frequency configuration can be used to distinguish DL CC number by identifying the preamble detection location, such approaches are not efficient in terms of radio resource usage, i.e., uplink radio resource.

An object of the present invention is to address at least one of the aforementioned problems and to improve the RACH procedure.

SUMMARY OF THE INVENTION

According to a first aspect of the present invention there is provided a method of configuring random access resources for random access transmission, the method comprising: determining a number n of preamble signatures that can be used for random access transmission; grouping the n preamble signatures into K groups j (j=1, 2 ... K) wherein K corresponds to a number of downlink component carriers and K is greater than or equal to 2; assigning each group j to a respective downlink component carrier; assigning configuration data to each group j; and transmitting the group j configuration data on the corresponding downlink component carrier.

Accordingly there is a reduced waste of uplink or downlink resources since the eNode is made aware of the downlink carrier the UE is camped on by means of the preamble signature and will not waste resources by using the wrong downlink carrier. Backward compatability and similar processing complexity to LTE can be maintained for LTE-A.

According to a second aspect of the present invention there is provided a method of random access transmission comprising: detecting a synchronization signal transmitted on a downlink component carrier receiving random access configuration data including a set of preamble signatures corresponding to the downlink component carrier; selecting a preamble signature from the set of preamble signatures related to the downlink component carrier; and transmitting a preamble with the preamble signature on an uplink component carrier corresponding to the downlink component carrier According to a third aspect of the present invention there is provided a user equipment for transmitting a random access preamble to a network entity, the user equipment comprising: a detector for detecting a synchronization signal transmitted on a downlink component carrier; a transceiver for receiving random access configuration data including a set of preamble signatures corresponding to the downlink component carrier; and a processor for selecting a preamble signature from the set of preamble signatures related to the downlink component carrier; the transceiver being operable to transmitting a preamble with the preamble signature on an uplink component carrier corresponding to the downlink component carrier.

According to a fourth aspect of the present invention there is provided a network entity for configuring random access resources for random access transmission, the network entity comprising: a transceiver for receiving a random access preamble and for transmitting random access configuration data on a downlink component carrier; a processor operable to: group n preamble signatures available for random access transmission into K groups j (j=1, 2 ... K) wherein K corresponds to a number of downlink component carriers and K is greater than or equal to 2; assign each group j to a respective downlink component carrier; and assign configuration data to each group for transmission on the corresponding downlink component carrier.

The methods according to the invention may be computer implemented. The methods may be implemented in software on a programmable apparatus. They may also be implemented solely in hardware or in software, or in a combination thereof.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION THE DRAWINGS

Embodiments of the invention will now be described, by way of example only, and with reference to the following drawings in which:—

FIG. 1 is a block diagram illustrating network structure of an E-UTRA (or LTE) system.

FIGS. 2(a), 2(b) and 2(c) are block diagrams depicting logic architecture of typical network entities of the LTE system (FIG. 2(a)), a user-plane (U-plane) protocol stack (FIG. 2(b)) and a control-plane (C-plane) protocol stack (FIG. 2(c)).

FIG. 3 graphically illustrates an example of the location of RACH slots in a 2.5 MHz bandwidth FIG. 4 is a diagram illustrating a typical RACH procedure FIG. 5 schematically illustrates a RACH preamble structure in E-UMTS FIG. 6 graphically illustrates an example of asymmetric down link/up link component carrier aggregation FIG. 7 graphically illustrates an example of a configuration of PRACH time slots FIG. 8A to 8C graphically illustrate an approach of using frequency position and/or RACH timing to distinguish between component carriers.

Figure 9:
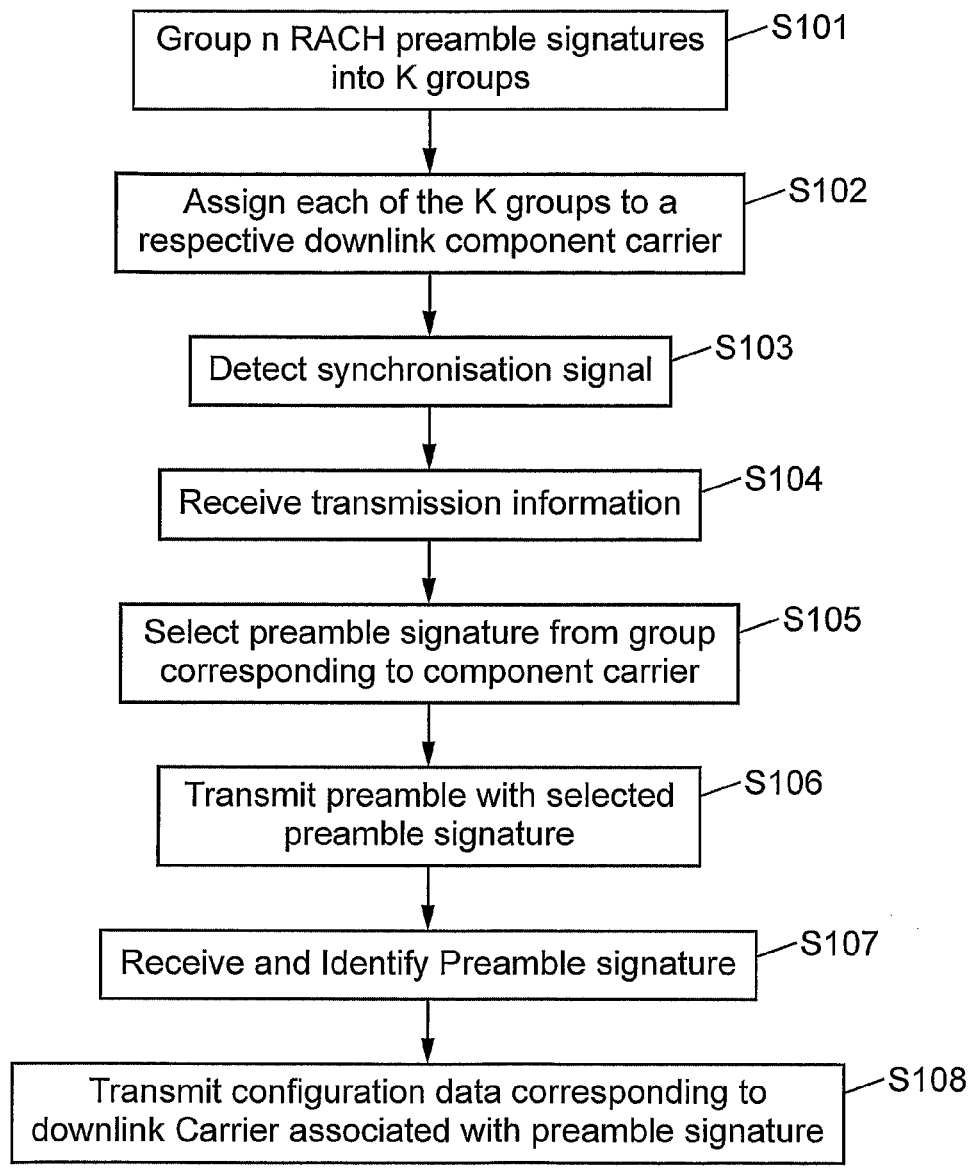

FIG. 9 is a flow chart illustrating a method of random access transmission according to at least one embodiment of the present invention.

FIG. 10 schematically illustrates allocating preamble signatures of a plurality of component carriers according to a first embodiment of the invention.

Figure 11:
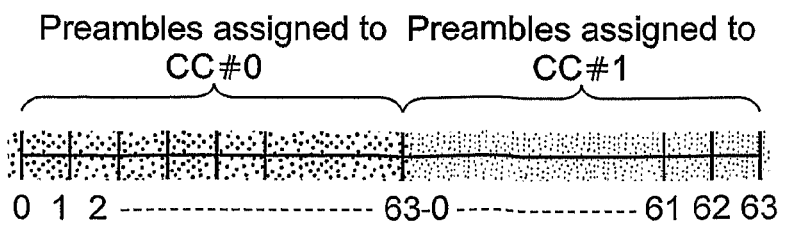

FIG. 11 schematically illustrates allocating preamble signatures of a plurality of component carriers according to an alternative embodiment of the invention.

DESCRIPTION OF PREFERRED EMBODIMENTS

Reference will now be made in detail to embodiments of the present invention, examples of which are illustrated in the accompanying drawings.

Embodiments of the present invention are directed to a RACH initial access procedure between a UE and an eNodeB.

FIG. 9 illustrates a random access procedure in LTE-A between a user equipment UE 101 and a base station eNodeB 103 according to the first embodiment of the present invention.

In step S101 n preamble signatures for random access transmission in the cell corresponding to eNodeB 103 are grouped into K groups j (j=1, 2 . . . K) where K corresponds to a number of downlink component carriers $CC_1$ to $CC_K$.

Preamble signatures should portray good autocorrelation properties in order for the eNodeB 103 to obtain an accurate timing estimation for a single preamble; and good cross correlation properties in order for the eNodeB 103 to obtain an accurate timing estimation for different preambles transmitted simultaneously by different UEs.

The Zadoff-Chu Zero Correlation Zone (ZC-ZCZ) sequences are used to fulfil these requirements. Each cell possesses a set of 64 signatures obtained from ZC-ZCZ sequences. The length of one sequence is N=839 samples. A ZC-ZCZ sequence is defined by two integers: u is the root index and v is the cyclic shift index.

In the time domain, the v-th cyclic shift is extracted from the u th root with:

$$x_{u,v}(n) = x_u(n + v \cdot N_{CS}) \quad n = 0 \ldots N-1$$

where $N_{CS}$ is the cyclic shift length.

The u-th root sequence in the frequency domain is given by:

$$x_u(n) = e^{j\pi \cdot u \cdot \frac{n(n+1)}{N}}$$

The ZC-ZCZ sequences are used because they can generate a large number of sequences and they offer interesting correlation properties: the autocorrelation function shows no side peaks. The cross correlation between two sequences obtained from different roots is $\sqrt{N}$. Thus ZC sequences have zero-cross-correlation zones.

Typically in LTE preamble signatures are grouped into three signature groups which are distinct from one each other and span the entire 64 signatures. One signature group is assigned explicitly to be used for the non-contention based access. The other two groups (A and B) are used for the contention based access. A UE selects group A or group B preamble sequence depending on the information size of message 3 of FIG. 4 and radio conditions. This grouping rule is configurable and is broadcast on BCCH. Consequently, for LTE-A, in order to share the 64 signatures among downlink component carriers $CC_1$ to $CC_K$, the grouping rule may be configured to be different for each downlink component carrier $CC_1$ to $CC_K$. The simplest example would be such that each group j of preamble signatures is assigned to one $CC_j$.

An illustrative example of assigning signatures to two different downlink component carriers $CC_1$ and $CC_2$ will be given with reference to FIG. 10, N preamble signatures from among 64 preamble signatures can be assigned for downlink component carrier $CC_1$. The size of group A size can be set to N preamble signatures and group B to 0. Alternatively the size of group A may be set at any value up to N and group B can be assigned the remaining preamble signatures up to N. For example the number of preamble signatures N assigned to $CC_1$ may be 32. Group A may be assigned a size of 32 whereby group A includes preamble signatures 0 to 31 in which case the size of group B would be 0. Thus preamble signatures can only be selected from group A. If however if Group A is assigned a number of preamble signatures 29 i.e. signatures 0 to 28. The size of group B will be 3 to include remaining preamble signatures 29, 30 and 31. In this latter case signatures for $CC_1$ can be selected from group A or B.

The remaining preamble signatures (preamble signatures N to 63) are then assigned for the downlink component carrier $CC_2$ only. This can be done by setting the size of group A for $CC_2$ to N preamble signatures whereby the size of group B size is N+1 to 64 signatures (i.e. 64−N+1 signatures). In the case of component carrier $CC_2$ the threshold for selecting one of the two groups A or B is set such that group B is always selected for component carrier $CC_2$. For example if as in the previous example 32 signatures are assigned to $CC_1$, i.e. preamble signatures 0 to 31, then the remaining signatures (64−32=32, preamble signatures 32 to 63) can be assigned to $CC_2$. In this case the size of group A for $CC_2$ is set at 32 to include signatures 0 to 31, which are no longer available to $CC_2$ since they have been assigned to CC1, and the remaining signatures available to $CC_2$ i.e. preamble signatures 32 to 63 are assigned to group B. The thresholds of group A and B are set such that a preamble signature cannot be selected from group A and will always be selected from group B i.e. from available preamble signatures 32 to 63.

In general the preamble signatures of the component carrier $CC_j$ corresponding to group j (j=1 to K), wherein j is greater than 1, are divided into a sub-group A and a sub-group B. The number of preamble signatures of sub-group A corresponds to the total number of preamble signatures in the component carriers of the preceding groups j=1 to j=j−1 and the threshold of selection is set that sub-group B, which includes preamble signatures which have not yet been assigned to groups j=1 to j=j−1, is selected for $CC_j$ To implement the selection criteria a power threshold value and a message and a size threshold value for selecting sub-group A or sub-group B is set such that sub-group B is always selected by a UE camping on a component carrier $CC_j$ where j is greater than 1.

In LTE there are 64 preambles per cell. In an alternative embodiment of the invention as illustrated in FIG. 11 instead of sharing the 64 signatures among multiple downlink component carriers an alternative approach would be to increase number of preamble signature per cell, for instance by multiples of 64 in order to be able to allocates to each downlink component carrier the total of 64 preambles (i.e. for two component carriers within the cell there could be 2×64 preambles).

Accordingly, in step S102 each group j of preamble signatures is assigned to a respective downlink component carrier $CC_0 \ldots CC_{K-1}$ of a number K of downlink component carriers.

In step S103 the UE 101 during an initial cell search detects a synchronization signal SCH transmitted on one of the downlink component carriers $CC_j$. In step S104 the UE 101 receives transmission information transmitted periodically from eNodeB 103 on a downlink broadcast channel PBCH or dynamic BCH. Such information includes available preamble signatures in the cell, period of available RACH slots, target power, threshold value for selecting sub-group A or sub-group B of preamble signatures, etc. In particular the transmission information includes the group j of preamble signatures corresponding to the downlink component carrier $CC_j$ detected by the UE 101.

In step S105 UE 101 selects a preamble signature from the group j of preamble signatures. In step S106 the UE 101 transmits a preamble signal to the eNode with the selected preamble signature on an uplink component carrier corresponding to the downlink component carrier CCj.

In step S106 the eNodeB 103 receives the preamble transmitted from UE 101. On reception of a signal the eNB 103 correlates the received signal in the RACH sub-frame with all possible signatures. Detection of the preamble can be either performed in the time domain or in the frequency domain. A detection variable is computed and if the detection variable exceeds a certain threshold, the preamble is considered detected.

From the preamble signature the eNodeB 103 can identify in step S107 the downlink component carrier $CC_j$ on which the UE 101 is camped since the preamble signature is selected from a group of preamble signatures assigned to that downlink component carrier $CC_j$.

In step S108 the eNodeB transmits to the UE 101 a random access response including random access configuration data assigned to that downlink carrier $CC_j$ on the downlink component carrier $CC_j$.

The step of allocating resources for uplink data transmission and downlink control transmission can include allocating the determined component carrier $CC_j$ for uplink data transmission and/or downlink control transmission or alternatively allocating another component carrier different to the determined component carrier $CC_j$ for uplink data transmission and/or downlink control transmission.

In embodiments of the invention since the grouping of preamble signatures is used to distinguish between downlink component carriers the same time and/or frequency configuration may be assigned to each downlink component carrier.

While embodiments of the present invention has been hereinbefore described in relation to the illustrative case of a 3GPP LTE or LTE-A system, those skilled in the wireless communication art will appreciate that the invention is applicable to communications systems other than 3GPP LTE or LTE-A systems.

Many further modifications and variations will suggest themselves to those versed in the art upon making reference to the foregoing illustrative embodiments, which are given by way of example only and which are not intended to limit the scope of the invention, that being determined solely by the appended claims.

The invention claimed is:

1. A method of configuring random access resources for random access transmission, the method comprising:
   determining, at a base station, a number n of preamble signatures that can be used for random access transmission, wherein the n preamble signatures are generated by using Zadoff-Chu Zero Correlation Zone (ZC-ZCZ) sequences;
   grouping the n preamble signatures into K groups, each of the K groups being named group j where j=1, 2 . . . K, wherein K corresponds to a number of downlink component carriers and K is an integer that is greater than or equal to 2, wherein the number n of preamble signatures increases by multiples of the number of downlink component carriers per cell;
   assigning each group j to a corresponding downlink component carrier;
   assigning configuration data to each group j;
   transmitting, from the base station, the configuration data for each group j on the corresponding downlink component carrier,
   wherein the configuration data include a threshold value for selecting one of several sub-groups of preamble signatures related to contention based access, and the threshold value is configured to be selected from a specific sub-group having a last preamble signature number;
   receiving, at the base station, an uplink component carrier including a random access preamble with a specific preamble signature selected based on information size of a contention resolution message and a radio condition;
   determining, at the base station, to which downlink component carrier or group j the specific preamble signature corresponds; and
   transmitting, from the base station, a random access response on the determined downlink component carrier.

2. The method according to claim 1, further comprising allocating resources for uplink data transmission and downlink control transmission prior to transmitting the random access response.

3. The method according to claim 2, wherein allocating the resources for the uplink data transmission and the downlink control transmission comprises allocating the determined downlink component carrier for at least the uplink data transmission or the downlink control transmission.

4. The method according to claim 1, wherein at least a same time or frequency configuration is assigned to each of downlink component carriers.

5. A method of random access transmission, the method comprising:
   detecting, at a user equipment (UE), a synchronization signal transmitted on a downlink component carrier;
   receiving, at the UE, random access configuration data including a specific preamble signature group corresponding to the downlink component carrier, wherein a number n of preamble signatures that can be used for random access transmission are divided into K preamble signature groups, wherein K corresponds to a number of downlink component carriers and K is an integer that is greater than or equal to 2, wherein the specific preamble signature group is generated by using Zadoff-Chu Zero Correlation Zone (ZC-ZCZ) sequences, wherein the number n of preamble signatures increases by multiples of the number of downlink component carriers per cell, and
   wherein the random access configuration data include a threshold value for selecting one of several sub-groups of preamble signatures related to contention based access, and the threshold value is configured to be selected from a specific sub-group having a last preamble signature number;
   selecting, at the UE, a preamble signature from the specific preamble signature group based on information size of a contention resolution message and a radio condition;
   transmitting, from the UE, a preamble with the selected preamble signature on an uplink component carrier corresponding to the downlink component carrier;
   receiving, at the UE, a random access response on the downlink component carrier, wherein the random access response includes configuration data indicating a component carrier for uplink data transmission and a component carrier for downlink control transmission;
   transmitting, from the UE, data on the indicated component carrier for the uplink data transmission; and receiving, at the UE, control data on the indicated component carrier for the downlink control transmission.

6. A user equipment for transmitting a random access preamble to a base station, the user equipment comprising:
- a detector for detecting a synchronization signal transmitted on a downlink component carrier;
- a transceiver for receiving random access configuration data including a specific preamble signature group corresponding to the downlink component carrier, wherein a number n of preamble signatures that can be used for random access transmission are divided into K preamble signature groups, wherein K corresponds to a number of downlink component carriers and K is an integer that is greater than or equal to 2, and wherein the specific preamble signature group is generated by using Zadoff-Chu Zero Correlation Zone (ZC-ZCZ) sequences, wherein the number n of preamble signatures increases by multiples of the number of downlink component carriers per cell; and
- a processor for selecting a preamble signature from the specific preamble signature group based on information size of a contention resolution message and a radio condition, wherein the transceiver is further for:

transmitting a preamble with the selected preamble signature on an uplink component carrier corresponding to the downlink component carrier;

receiving a random access response on the downlink component carrier, wherein the random access response includes configuration data indicating a component carrier for uplink data transmission and a component for downlink control transmission, wherein the configuration data include a threshold value for selecting one of several sub-groups of preamble signatures related to contention based access, and the threshold value is configured to be selected from a specific sub-group having a last preamble signature number;

transmitting data on the indicated component carrier for the uplink data transmission; and receiving control data on the indicated component carrier for the downlink control transmission.

7. A base station for configuring random access resources for random access transmission, the base station comprising:
- a transceiver for receiving a random access preamble and for transmitting random access configuration data on a downlink component carrier; and
- a processor for:
- grouping n preamble signatures available for random access transmission into K groups, each group being named group j where j=1, 2 . . . K, wherein K corresponds to a number of downlink component carriers and K is an integer that is greater than or equal to 2, and wherein the n preamble signatures are generated by using Zadoff-Chu Zero Correlation Zone (ZC-ZCZ) sequences, wherein the number n of preamble signatures increases by multiples of the number of downlink component carriers per cell;
- assigning each group j to a corresponding downlink component carrier;
- assigning configuration data to each group j for transmission on the corresponding downlink component carrier, wherein the configuration data include a threshold value for selecting one of several sub-groups of preamble signatures related to contention based access, and the threshold value is configured to be selected from a specific sub-group having a last preamble signature number;
- controlling the transceiver for transmitting the configuration data for each group j on the corresponding downlink component carrier and for receiving an uplink component carrier including a random access preamble with a specific preamble signature selected based on information size of a contention resolution message and a radio condition;
- determining to which downlink component carrier or group j the specific preamble signature corresponds; and
- controlling the transceiver for transmitting a random access response on the determined downlink component carrier.

* * * * *